(12) United States Patent
Raghavendra et al.

(10) Patent No.: US 10,963,363 B2
(45) Date of Patent: *Mar. 30, 2021

(54) CORRELATION BASED ADAPTIVE SYSTEM MONITORING

(71) Applicant: International Business Machines Corporation, Armonk, NY (US)

(72) Inventors: Ramya Raghavendra, New York, NY (US); Murtaza Zafer, White Plains, NY (US); Bong Jun Ko, Harrington Park, NJ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,152

(22) Filed: Jan. 30, 2020

(65) Prior Publication Data

US 2020/0167260 A1 May 28, 2020

Related U.S. Application Data

(63) Continuation of application No. 13/454,224, filed on Apr. 24, 2012, now Pat. No. 10,599,545.

(51) Int. Cl.
*G06F 11/34* (2006.01)
*H04L 12/26* (2006.01)
*H04L 12/24* (2006.01)

(52) U.S. Cl.
CPC ...... *G06F 11/3452* (2013.01); *G06F 11/3433* (2013.01); *G06F 11/3495* (2013.01);
(Continued)

(58) Field of Classification Search
CPC ........... G06F 11/3452; G06F 2201/815; G06F 11/3495; G06F 11/34; G06F 2201/86;
(Continued)

(56) References Cited

U.S. PATENT DOCUMENTS

6,742,128 B1 * 5/2004 Joiner ................. H04L 63/1408
726/25
7,386,417 B1 * 6/2008 Bao ...................... G06F 11/0724
375/343
(Continued)

*Primary Examiner* — Tonia L Dollinger
*Assistant Examiner* — Mehulkumar J Shah
(74) *Attorney, Agent, or Firm* — Scully, Scott, Murphy & Presser, P.C.; Vazken Alexanian (57) ABSTRACT

A method, system and computer program product for adaptive system monitoring. In one embodiment, the method comprises generating time-varying correlation graphs indicating correlations between a multitude of parameters of the system, and using the correlation graphs to identify monitoring logic for monitoring the system. In an embodiment, the correlation graphs are used to select a group of the parameters as monitoring parameters, and these monitoring parameters are dynamically changed. In one embodiment, the monitoring parameters form sets of monitoring parameters, and each set of monitoring parameters is used to monitor the system for an associated period of time. The lengths of these monitoring periods are changed based on the rate of change of the correlation graphs. In an embodiment, the rate at which the monitoring parameters are changed is itself changed based on the rate of change of the correlation graphs.

20 Claims, 7 Drawing Sheets (52) U.S. Cl.
CPC .... *G06F 2201/815* (2013.01); *G06F 2201/86* (2013.01); *H04L 41/142* (2013.01); *H04L 41/5067* (2013.01); *H04L 43/0817* (2013.01)

(58) Field of Classification Search
CPC ............... G06F 11/3433; H04L 41/142; H04L 43/0817; H04L 12/26; H04L 12/24; H04L 41/5067
USPC ............. 709/223, 224; 370/252; 714/39
See application file for complete search history.

(56) References Cited

U.S. PATENT DOCUMENTS

| | | | |
|---|---|---|---|
| 2003/0065986 A1* | 4/2003 | Fraenkel | G06F 11/3089 714/47.2 |
| 2003/0079160 A1 | 4/2003 | McGee et al. | |
| 2003/0110007 A1* | 6/2003 | McGee | G06F 11/3452 702/179 |
| 2005/0060403 A1 | 3/2005 | Bernstein et al. | |
| 2006/0015603 A1 | 1/2006 | Jakobson et al. | |
| 2007/0016687 A1 | 1/2007 | Agarwal et al. | |
| 2007/0088223 A1* | 4/2007 | Mann | A61B 5/0452 600/485 |
| 2007/0225023 A1 | 9/2007 | Abusch-Magder | |
| 2007/0263550 A1* | 11/2007 | Perng | H04L 43/045 370/252 |
| 2008/0216098 A1* | 9/2008 | Agarwal | G06F 11/008 719/328 |
| 2008/0235532 A1 | 9/2008 | Pomerantz | |
| 2009/0109959 A1 | 4/2009 | Elliott et al. | |
| 2009/0216624 A1 | 8/2009 | Kato | |
| 2009/0282922 A1* | 11/2009 | Gerstenberg | G01N 29/265 73/606 |
| 2011/0128930 A1 | 6/2011 | Furushar et al. | |
| 2012/0054331 A1* | 3/2012 | Dagan | H04L 43/0817 709/224 |

* cited by examiner

FIG. 8

CORRELATION BASED ADAPTIVE SYSTEM MONITORING

CROSS REFERENCE TO RELATED APPLICATION

This application is a continuation of copending U.S. patent application Ser. No. 13/454,224, filed Apr. 24, 2012, the entire contents and disclosure of which are hereby incorporated herein by reference.

STATEMENT REGARDING FEDERALLY SPONSORED RESEARCH OR DEVELOPMENT

This invention was made with government support under Contract No. 60NANB10D003 awarded by National Institute of Standards and Technology (NIST). The government has certain rights in the invention.

BACKGROUND

This invention generally relates to systems of computer devices, and more specifically to adaptive monitoring of such systems.

Systems of computer devices are becoming increasingly heterogeneous and complex. At the same time, such systems are also becoming more and more service driven, from which users expect constant, reliable service availability.

For example, networks today may include a large variety of different access networks and core networks and may be required to offer many services simultaneously. In addition, these networks may need to exhibit a much more dynamic behavior than in the past in order to be able to adapt, substantially in real-time, to end user needs for best quality of experience (QoE) and operator needs for optimal resource management at reasonable operator expenditure (OPEX).

These factors make network management complicated and the requirements and the expectations that network operators are able to offer (user-centric, end-to-end, always-best connectivity) become high. Particularly, it requires network management systems that are complex, distributed and to a large extent adaptive to changes in the network. This, among other reasons, drives the development towards policy-based network management that is adapted to deploy expert knowledge in the network regarding services, inter-action between services, user preferences and strategic views of business to allow the network to make decisions on how to manage these services in a dynamic, heterogeneous multi-service environment.

In any distributed self-managed network, for example driven by policies, the devices of the network exhibit individual behavior in order to fulfill a service and/or user requirements. This individual behavior will affect the network as a whole. Therefore it becomes crucial to be able to observe the behavior of the network for purposes such as forecasting and detection of undesired behavior and malfunctioning devices. In order to be able to monitor the behavior of the network, the management system needs to monitor events relevant to the network as well as the status of the network.

In order to be useful, the management system may infer both how and what the network is doing (events relevant to the network) and how this impacts the status of the network. Ideally, the management system may extrapolate what might happen in the network based on knowledge about what has happened in the network in the past. For this purpose, so called Key Performance Indicators (KPI) and Key Quality Indicators are used that describe how network operators evaluate the efficiency and effectiveness of their use of existing network resources. These indicators can be based on a single performance parameter such as the number of missed calls on a network device or in a network. The indicators can also be based on complex equations involving multiple network parameters.

Other types of systems of computers or computing devices, such as systems of hosts, networked devices, virtual machines, and other devices, may be monitored in order to achieve or fulfill service or user requirements, or to manage or improve the operation or efficiency of the system.

Monitoring large data-centers, for example, is critical for performance management and troubleshooting, and requires monitoring tens to hundreds of thousands of physical servers and network elements. With vitalization, when a physical machine can host one or more virtual machines which need to be individually monitored, the monitoring requirements further increase to monitoring millions of elements over time. The rate of monitoring (i.e., number of samples measured per unit time) is a critical factor in troubleshooting performance problems; however, there is a natural trade-off between the amount of monitoring and troubleshooting accuracy. The higher the rate of monitoring, the higher is the accuracy, but the amount of monitoring overhead is also higher. Thus, most monitoring systems seek to achieve a balance between monitoring accuracy and overhead.

In the case of data-center networks, troubleshooting performance problems is particularly hard. This is because the time-scale over which events happen can be on the order of milliseconds to a few seconds, while most monitoring systems measure performance at the average rate of a few minutes. Thus, many events may not get captured; for example, short bursts of data flows can happen between virtual machines (VMs) which can cause packet losses on the internal network due to network congestion or a short-lived spike in CPU utilization by a VM. Such performance problems directly affect the short-term application performance, but are hard to detect with coarse grained monitoring. This creates a need for fine grained monitoring of data-center elements, but the monitoring overhead can be prohibitively high.

Existing solutions range from lightweight techniques such as collecting packet counters at the interfaces using SNMP and flow-level counters using tools like NetFlow, to detailed application-level logs and fine-grain packet logs. While the effectiveness of the former technique depends on the time granularity of logging, the latter technique is expensive to run continuously. Adaptive monitoring techniques also exist that vary the monitoring rate over time; however, these are mainly adaptations from large scale wired networks, which are distributed techniques for adaptive monitoring of network elements using local information.

BRIEF SUMMARY

Embodiments of the invention provide a method, system and computer program product for adaptive system monitoring. In one embodiment, the method comprises generating time-varying correlation graphs indicating correlations between a multitude of parameters of the system, and using the correlation graphs to identify monitoring logic for monitoring the system.

In an embodiment, the correlation graphs are used to select a group of the parameters as monitoring parameters that are used to monitor the system, and these monitoring parameters are dynamically changed.

In one embodiment, the monitoring parameters form a multitude of sets of monitoring parameters, and each set of monitoring parameters is used to monitor the system for an associated period of time. The lengths of these monitoring periods are changed based on the rate of change of the correlation graphs.

In an embodiment, the rate at which the monitoring parameters are selected is itself changed based on the rate of change of the correlation graphs.

In one embodiment, a correlation graph is generated by monitoring a first plurality of the parameters of the system during a first time period, and generating the correlation graph from this first plurality of parameters.

In an embodiment, this correlation graph is analyzed to select a second plurality of the parameters to monitor the system during a second time period. In an embodiment, this second time period is after the first time period.

In one embodiment, the correlation graphs identify the parameters that have a predefined correlation with other parameters.

In an embodiment, each of the correlation graphs includes a multitude of nodes and edges. The nodes represent the parameters of the system, and the edges connect the nodes together and represent the correlations between the parameters.

In one embodiment, the parameters include elements and processes of the system, and the correlation graphs are queried for one or more defined metrics.

Embodiments of the invention provide an adaptive monitoring system that utilizes a time-varying correlation graph to optimize monitoring for the same amount of overhead. An observation behind embodiments of the invention is that in a data-center, user applications are run across multiple servers utilizing many VMs, thus creating strong correlations among the various system elements. For example, a spike in CPU utilization of a load balancer may be highly correlated with load of back end servers, thus creating strong correlations among the CPU utilization of the corresponding VMs; similarly virtual switches may have correlated measurements. While these correlations are dependent on the actual system and application deployment, embodiments of the invention take a system/application independent approach and extract such information by constructing correlations graphs. These correlations graphs are then mined to optimally select monitoring nodes and parameters, which are then dynamically altered as the correlation graph changes over time. For example, based on the correlation graph, one can determine the nodes/elements with high graph centrality and monitor these nodes at a higher rate than other nodes.

With embodiments of the invention, as compared with a present standard monitoring system, for the same amount of measurement overhead, a higher monitoring accuracy can be achieved. This is because by mining a correlation graph and optimizing monitoring parameters, redundant measurements can be reduced. System elements with a high graph centrality can be monitored with higher rates while other nodes can be monitored at lower rates. Furthermore, the monitoring times can be optimally selected so that redundant measurements can be minimized, while measurements at intermediate times can be estimated from measurements of neighboring nodes in the correlation graph.

Adaptive system monitoring refers to changing or adjusting the way the system is monitored over time. The changes or adjustments may be made based on factors internal to the system such as the system performance or the load on the system. Alternatively, or in combination with internal factors, the changes of the way the system is monitored may be based on external factors such as changes in user requirements or preferences.

Embodiments of the invention may be used to monitor a wide variety of types of systems. For example, embodiments of the invention may be used to monitor data centers and computer networks. Embodiments of the invention may also be used to monitor other KPIs in a system of devices (hosts, network devices, virtual machines), with a data system and cloud system being representative examples.

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
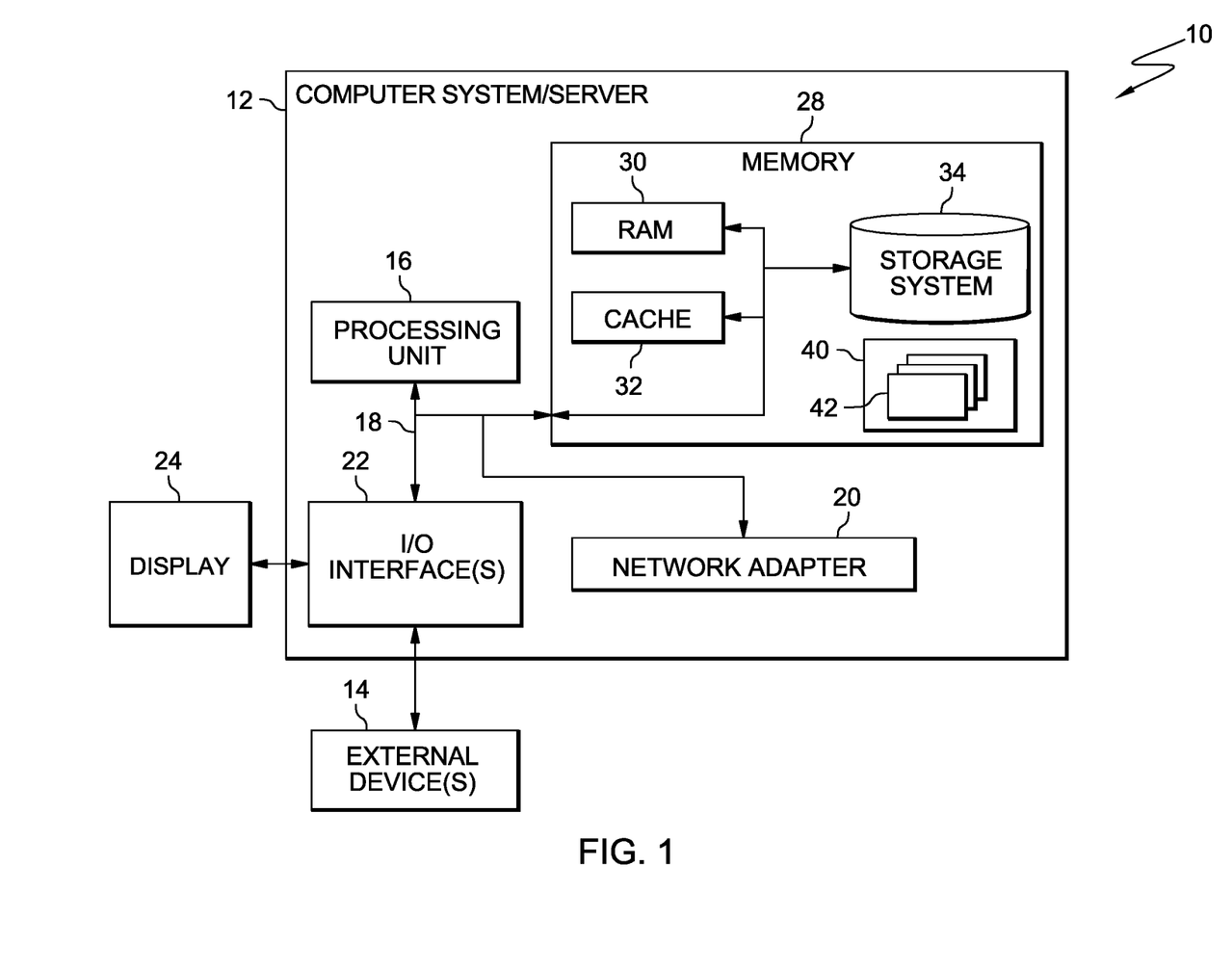
FIG. 1 depicts a cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
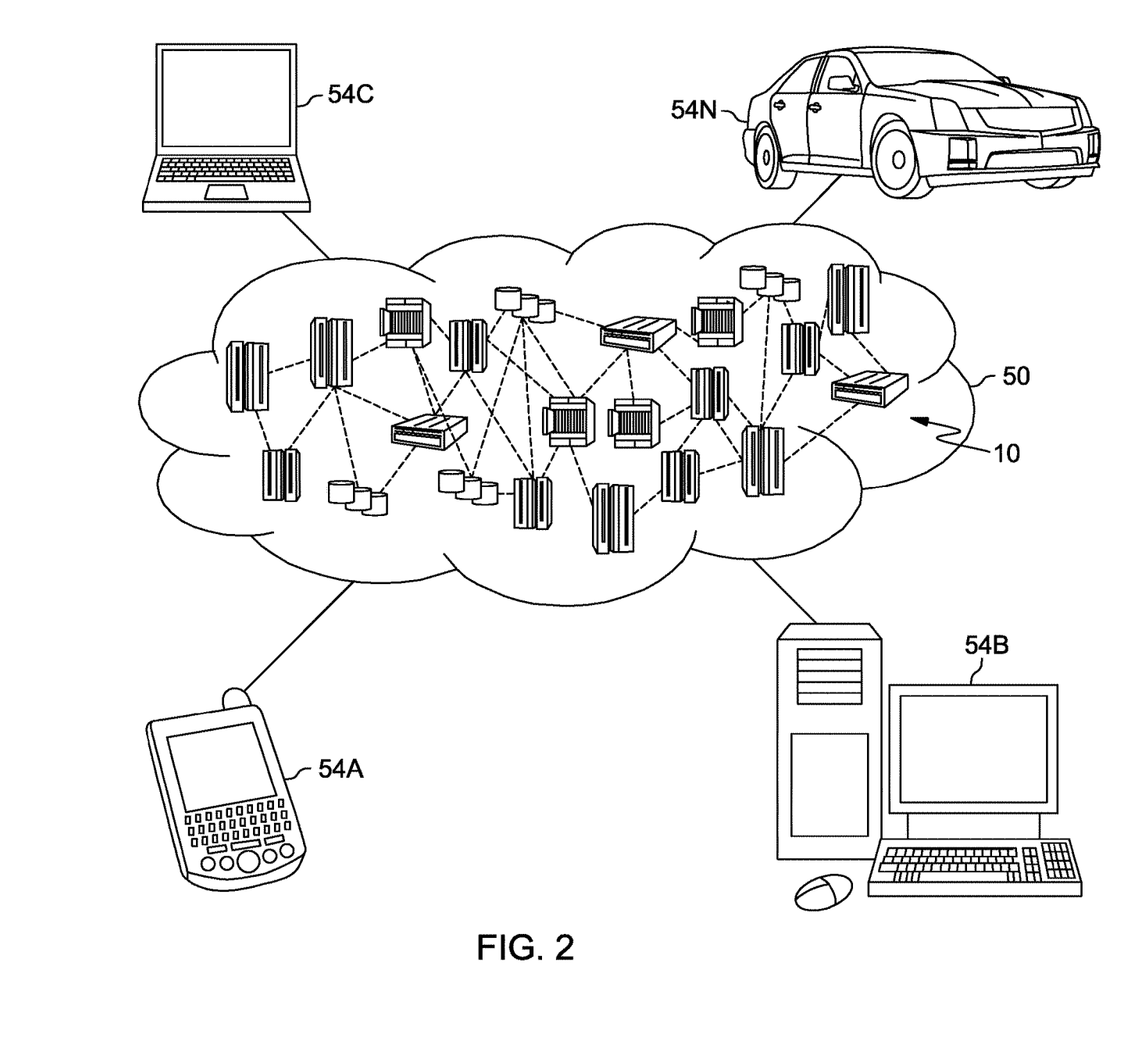
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
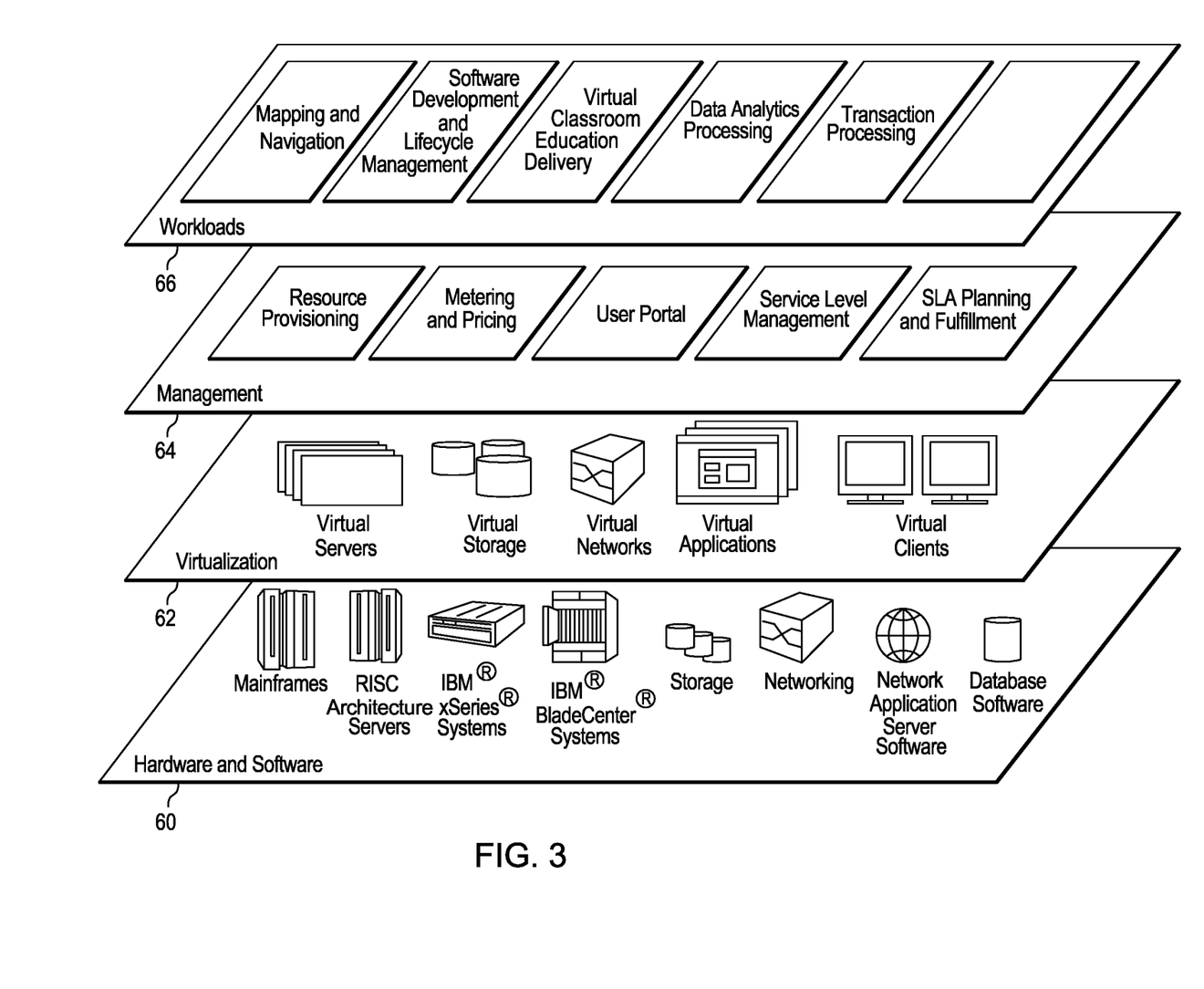
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and correlation based adaptive network monitoring.

Embodiments of the present invention provide a method, system and computer program product for adaptive system monitoring. In one embodiment, the method comprises generating time-varying correlation graphs indicating correlations between a multitude of parameters of the system, and using the correlation graphs to identify monitoring logic for monitoring the system. In an embodiment, the correlation graphs are used to select a group of the multitude of parameters as monitoring parameters, and the monitoring parameters are used to monitor the system, and these monitoring parameters are dynamically changed.

Embodiments of the invention provide an adaptive monitoring system that utilizes a time-varying correlation graph to optimize monitoring for the same amount of overhead. An observation behind embodiments of the invention is that in a data-center, user applications are run across multiple servers utilizing many virtual machines (VMs), thus creating strong correlations among the various system elements. For example, a spike in CPU utilization of a load balancer may be highly correlated with the load of back end servers, thus creating strong correlations among the CPU utilization of the corresponding VMs; similarly virtual switches may have correlated measurements. While these correlations are dependent on the actual system and application deployment, embodiments of the invention takes a system/application independent approach and extract such information by constructing correlations graphs. These correlations graphs are then mined to optimally select monitoring nodes and parameters, which are then dynamically altered as the correlation graph changes over time. For example, based on the correlation graph, one can determine the nodes/elements with high graph centrality and monitor these nodes at a higher rate than other nodes.

With embodiments of the invention, as compared with a present standard monitoring system, for the same amount of measurement overhead, a higher monitoring accuracy can be achieved. This is because by mining a correlation graph and optimizing monitoring parameters, redundant measurements can be reduced. System elements with a high graph centrality can be monitored with higher rates while other nodes can be monitored at lower rates. Furthermore, the monitoring times can be optimally selected so that redundant measurements can be minimized, while measurements at intermediate times can be estimated from measurements of neighboring nodes in the correlation graph.

As an example, details will be described of an embodiment of the invention for the application of monitoring in a cloud-based data center. Typically, servers in data centers are instrumented to collect KPIs and periodically transmit them to a central server. These logs can be used for visualization, troubleshooting and so on. In order to keep the communication overhead low, and avoid collecting large amounts of data, the monitoring granularity is in the order of minutes (15 minutes was the common granularity in the monitored data centers). Studies of data center traffic have revealed that typical flow lengths are much shorter, and problems of CPU and memory oversubscription do not last for more than a few minutes. Detailed application level logs and packet traces are too expensive to run continuously and still offer too little insight on where the performance problems lie.

Figure 4:
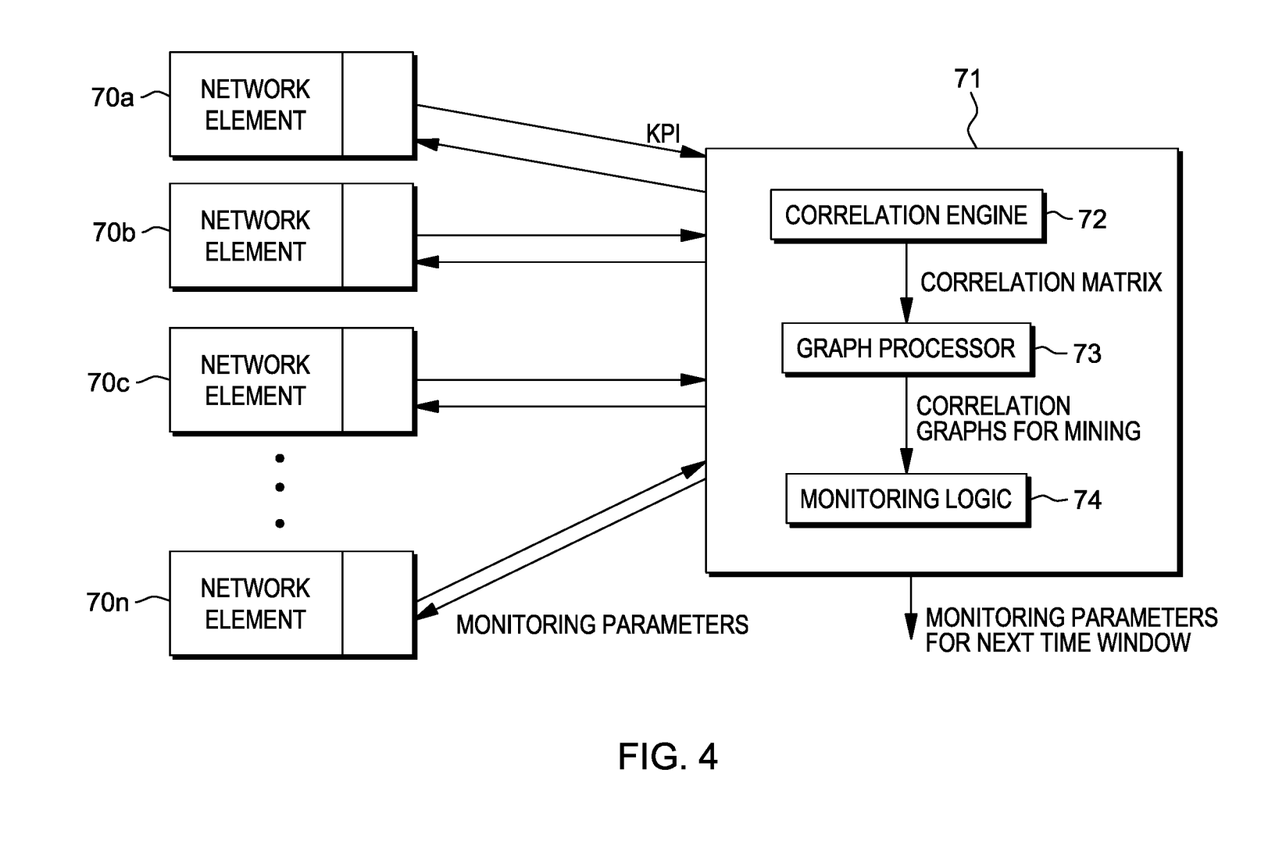
FIG. 4 illustrates the architecture of a network monitoring system in accordance with an embodiment of the invention.

Embodiments of the invention address this problem by the means of an adaptive, lightweight profiling of the hosts based on the correlations that exist between KPIs and between hosts. The overall architecture of an embodiment of the invention is illustrated in FIG. 4. Steps used in an embodiment of the adaptive monitoring procedure are outlined in FIG. 5.

FIG. 4 shows a group of network elements 70a-70n, and an agent 71 that, in turn, includes a correlation engine 72, a graph processor 73 and monitoring logic 74. The centerpiece of an embodiment of the invention is the adaptive monitoring logic using correlations between time series. The monitoring logic is the main intelligence of the monitoring system. Based on the correlations, the monitoring logic decides which nodes to monitor with higher granularity, which nodes do not need to be monitored due to high correlation, etc.

Figure 5:
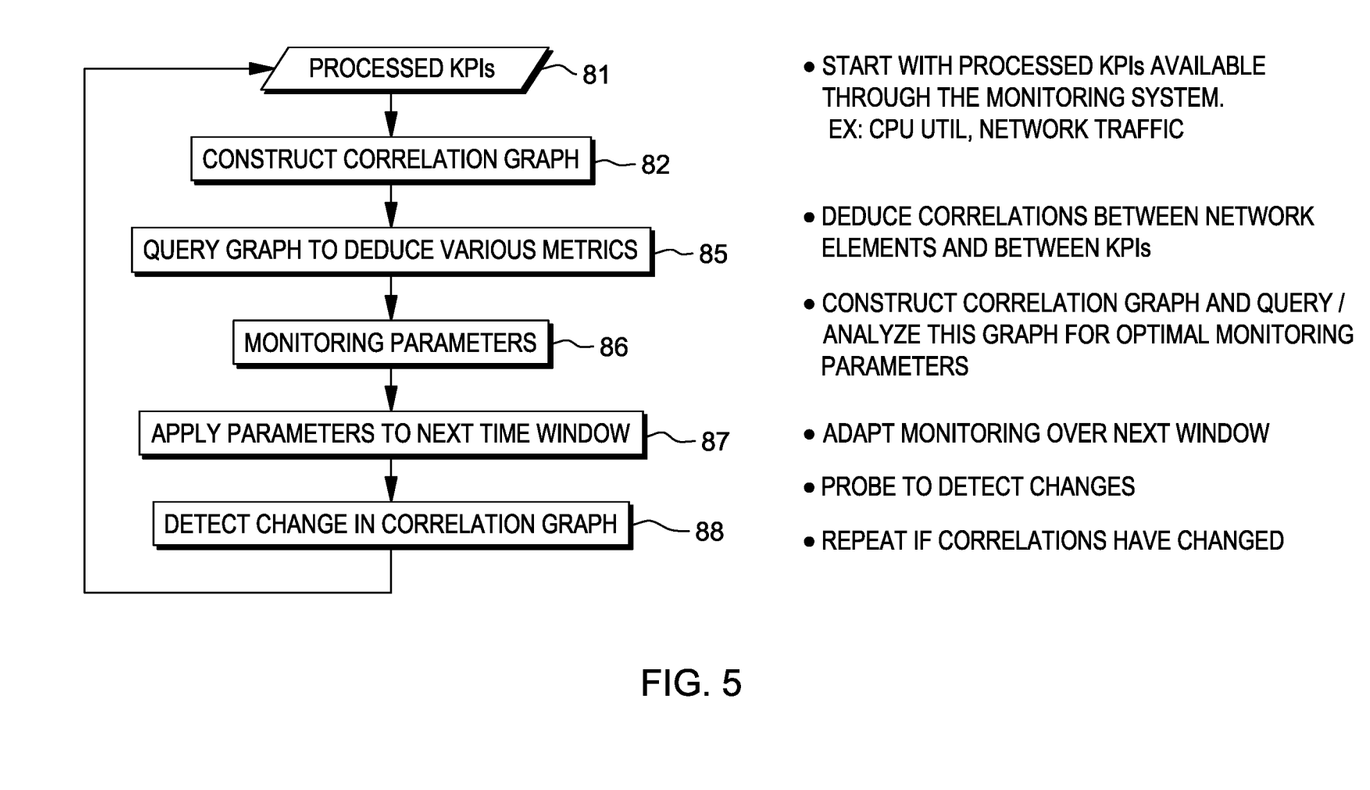
FIG. 5 shows steps in an adaptive network monitoring procedure in accordance with an embodiment of the invention.

With reference to FIGS. 4 and 5, during a learning phase, at step 81, the agent 71 observes the KPIs and constructs a correlation matrix among the KPIs of all the processes that need to be measured. The correlation matrix may be a simple matrix (essentially a lookup table) which holds correlations between the system elements that are being monitored. As an example, say the KPI being monitored is CPU utilization of servers. A correlation matrix will hold the pairwise correlation values of CPU utilization for each server. At the end of the learning phase, the agent 71, at step 82, constructs the correlation graph wherein the nodes of the graph are monitored processes and edges between two nodes denote correlation values.

Figure 6:
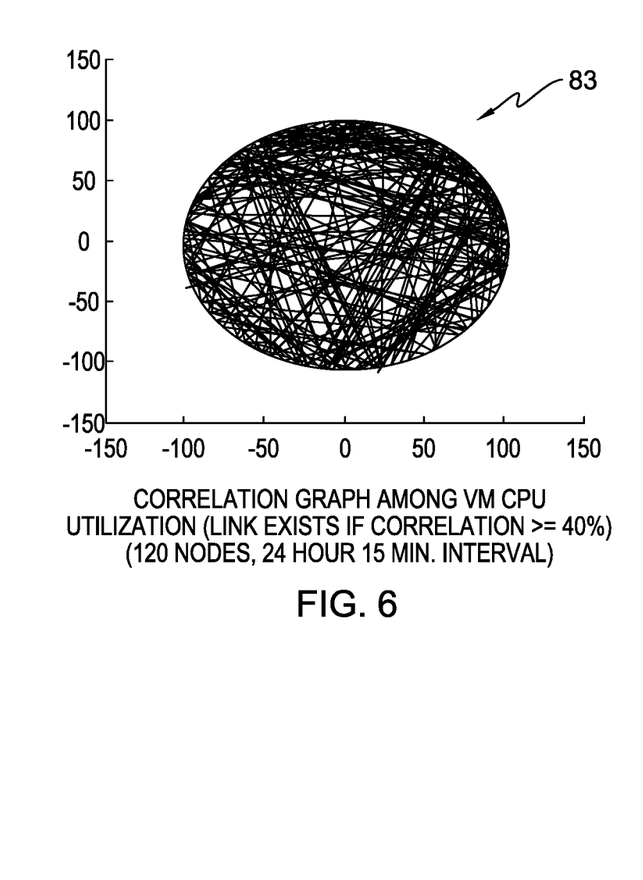
FIG. 6 depicts an example correlation graph that may be obtained in embodiments of the invention.
Figure 7:
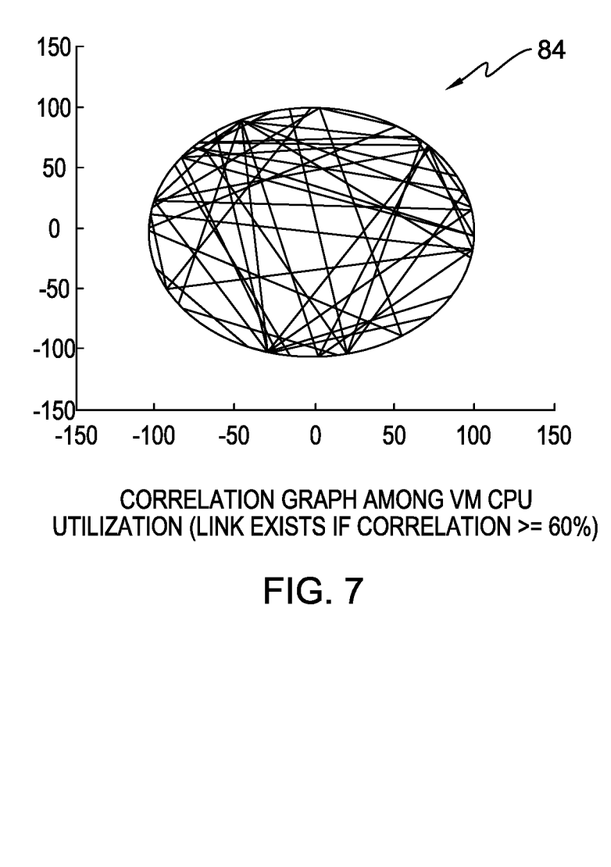
FIG. 7 shows a second example correlation graph that may be obtained in embodiments of this invention.

FIGS. 6 and 7 illustrate two example correlation graphs, referenced at 83 and 84, respectively, that may be obtained in the implementation of embodiments of the invention. FIG. 6 shows a correlation graph among VM CPU utilization, and a link is shown between two nodes if the correlation between the two nodes is equal to or greater than 40%. FIG. 7 also shows a correlation graph among VM CPU utilization; however, in this graph, a link is shown between two nodes if the correlation between those two nodes is equal to or greater than 60%.

The above-described correlation graphs are examples of how to represent correlations. In embodiments of the invention correlation graphs can be represented by one or more of multiple forms (or data structures), for example, as a matrix, a set of nodes and a set of links, a set of nodes and an associated set of links for each node, and in other ways.

With reference again to FIGS. 4 and 5, the monitoring logic 74 is obtained, at step 85, on mining this graph; for instance, to deduce various metrics such as nodes with high centrality, clusters with high edge weights, etc. Based on the information mined from this graph, the monitoring parameters are selected, at step 86, for the measurement phase for the next time window. The selected monitoring parameters are, at step 87, applied during that next time window; and, at step 88, any change in the correlation graph may be detected, after which the matrices may be recomputed and the succeeding steps repeated.

The monitoring logic, in embodiments of the invention, will reside at one or more elements in the data center. When located at the physical machine, the monitoring engine, as represented at 90 in FIG. 8, may takes virtual machine (VM) and physical machine (PM) KPIs as inputs to determine the correlations at VM level. These correlations can exist between KPIs (ex: increase in network traffic related to increase in CPU activity) or between VMs (ex: increase in requests to web server triggering increased database look-ups, both located on different VMs). Collection agents 91 may be used to collect the KPIs from the VMs and the vSwitches, and these agents 91 may also filter the monitoring results and send the filtered results to the monitoring server.

Figure 8:
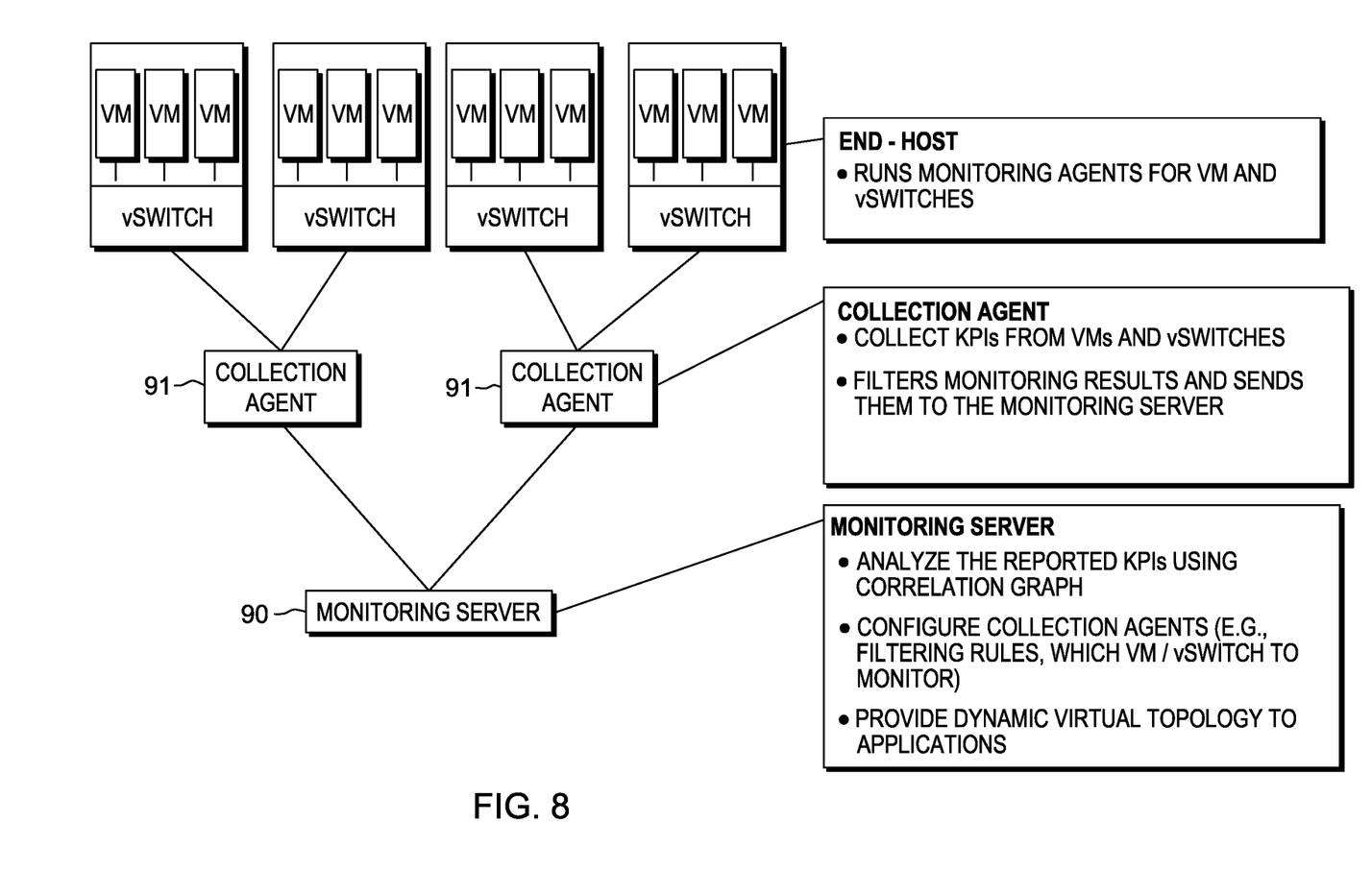
FIG. 8 illustrates a monitoring server that receives KPIs to determine correlations at a Virtual Machine level.

The agent located at the PM is capable of identifying these relations. The monitoring agent located at the host are able to communicate with agents located at various tiers of the data center in order to monitor adaptively. An agent located at the blade center is able to observe correlations between racks, and is able balance monitoring budget between the racks. For example, a rack that is highly correlated can be assigned a lower monitoring budget than another rack whose blades have relatively lower correlations.

Another application of correlation based monitoring is in correlating events with KPIs. A new event is described as any change to the data center network, physical systems or architecture. As an example, consider a new VM that gets initialized in a part of the network. such an event will be correlated with changes in KPIs, including increase in network traffic, CPU usage and so on. Other events include (but are not limited to) the network interface going down, a storage disk failing and so on.

Embodiments of the invention may be used to monitor a wide variety of types of systems. For example, embodiments of the invention may be used to monitor data centers and computer networks. Embodiments of the invention may also be used to monitor other KPIs in a system of devices (hosts, network devices, virtual machines), with a data system and cloud system being representative examples.

While it is apparent that the invention herein disclosed is well calculated to achieve the features discussed above, it will be appreciated that numerous modifications and embodiments may be devised by those skilled in the art, and it is intended that the appended claims cover all such modifications and embodiments as fall within the scope of the claims.

The invention claimed is:

1. A computer-implemented method of dynamic, adaptive monitoring of a computer system, the method comprising:
    a server processing system identifying monitoring logic for monitoring the computer system, including
        the server processing system receiving performance indicators of a plurality of processes of the computer system,
        the server processing system constructing a correlation matrix among the received performance indicators, wherein the correlation matrix is a table holding correlation values between the plurality of processes of the computer system,
        the server processing system using the correlation matrix to construct a time-varying correlation graph indicating defined, changing correlations between a multitude of performance parameters of the computer system, and
        the server processing system mining the correlation graph to obtain the monitoring logic for monitoring the computer system, including
            deducing metrics from the correlation graphs, and based on information mined from the correlation graph, selecting a group of performance parameters, from the multitude of performance parameters, for monitoring elements of the computer system;
    using the selected group of the performance parameters to monitor the elements of the computer system; and
    the server processing system dynamically altering the group of performance parameters selected for monitoring the elements of the computer system as the time-varying correlation graph changes over time by selecting different groups of the performance parameters at different times for monitoring the elements of the computer system, the different groups of the performance parameters being selected at the different tiems based on changes in the defined correlations indicated in the correlation graph to reduce redundant measurements in the computer system.

2. The method according to claim 1, wherein the correlation graph includes nodes representing the plurality of processes.

3. The method according to claim 2, wherein the mining the correlation graph includes mining the correlation graph to deduce ones of the nodes with a specified centrality.

4. The method according to claim 2, wherein the correlation graph further includes edges between the nodes, the edges representing the correlation values between the processes of the computer system.

5. The method according to claim 4, wherein the mining the correlation graph includes mining the correlation graph to deduce clusters of the nodes with edges representing specified correlation values.

6. The method according to claim 1, wherein:
    the receiving performance indicators includes receiving the performance indicators during a learning phase; and
    the using the correlation matrix to construct a time-varying correlation graph includes constructing the correlation graph at an end of the learning phase.

7. The method according to claim 6, wherein the selecting a group of performance parameters for monitoring the elements of the computer system includes selecting the group of performance parameters for a measurement phase.

8. The method according to claim 1, wherein the using the correlation graph further includes identifying a rate of change of the correlation graphs using a defined criteria.

9. The method according to claim 8, wherein the using the selected group of the performance parameters includes using each of the selected groups of the performance parameters for monitoring the system for an associated time period, and changing the lengths of the time periods based on the rate of change of the correlation graph.

10. The method according to claim 8, wherein the changing the group of performance parameters includes dynamically changing the group of performance parameters based on the rate of change of the correlation graphs.

11. A monitoring system for dynamic, adaptive monitoring of a system of devices, the monitoring system comprising:
    one or more processing units configured for:
    identifying monitoring logic for monitoring the system of devices, including
        receiving performance indicators from a plurality of devices of the system of devices,
        constructing a correlation matrix among the received performance indicators, wherein the correlation matrix is a table holding correlation values between the plurality of devices,
        using the correlation matrix to construct a time-varying correlation graph indicating defined, changing correlations between a multitude of performance parameters of the system of devices, and
        mining the correlation graph to obtain the monitoring logic for monitoring the system of devices, including
            deducing metrics from the correlation graph, and based on information mined from the correlation graph, selecting a group of the performance parameters, from the multitude of performance parameters, as monitoring parameters, from the multitude of performance parameters, for monitoring the system of devices;
    using the selected group of the performance parameters to monitor the system of devices; and
    dynamically altering the group of performance parameters selected for monitoring the system of devices as the time-varying correlation graph changes over time by selecting different groups of the performance parameters at different times for monitoring the system of devices, the different groups of the performance parameters being selected at the different times based on changes in the defined correlations indicated in the correlation graph.

12. The monitoring system according to claim 11, wherein the correlation graph includes nodes representing the plurality of processes.

13. The monitoring system according to claim 12, wherein the mining the correlation graph includes mining the correlation graph to deduce ones of the nodes with a specified centrality.

14. The monitoring system according to claim 12, wherein the correlation graph further includes edges between the nodes, the edges representing the correlation values between the processes of the computer system.

15. The monitoring system according to claim 14, wherein the mining the correlation graph includes mining the correlation graph to deduce clusters of the nodes with edges representing specified correlation values.

16. An article of manufacture comprising:
at least one tangible computer readable device having computer readable program code logic tangibly embodied therein for dynamic, adaptive monitoring of a computer system, said program code logic, when executing in one or more processing units, performing the following:
identifying monitoring logic for monitoring the computer system, including
receiving performance indicators of a plurality of processes of the computer system,
constructing a correlation matrix among the received performance indicators, wherein the correlation matrix is a table holding correlation values between the plurality of processes of the computer system,
using the correlation matrix to construct a time-varying correlation graph indicating defined, changing correlations between a multitude of performance parameters of the computer system, and
mining the correlation graph to obtain the monitoring logic for monitoring the computer system, including
deducing metrics from the correlation graphs, and
based on information mined from the correlation graph, selecting a group of performance parameters, from the multitude of performance parameters, for monitoring elements of the computer system;
using the selected group of the performance parameters to monitor the elements of the computer system; and
dynamically altering the group of performance parameters selected for monitoring the elements of the computer system as the time-varying correlation graph changes over time by selecting different groups of the performance parameters at different times for monitoring the elements of the computer system, the different groups of the performance parameters being selected at the different tiems based on changes in the defined correlations indicated in the correlation graph to reduce redundant measurements in the computer system.

17. The article of manufacture according to claim 16, wherein the correlation graph includes nodes representing the plurality of processes.

18. The article of manufacture according to claim 17, wherein the mining the correlation graph includes mining the correlation graph to deduce ones of the nodes with a specified centrality.

19. The article of manufacture according to claim 17, wherein the correlation graph further includes edges between the nodes, the edges representing the correlation values between the processes of the computer system.

20. The article of manufacture according to claim 19, wherein the mining the correlation graph includes mining the correlation graph to deduce clusters of the nodes with edges representing specified correlation values.

* * * * *